(12) United States Patent
Kim

(10) Patent No.: US 7,576,490 B2
(45) Date of Patent: Aug. 18, 2009

(54) PLASMA DISPLAY PANEL

(75) Inventor: Chul-Hong Kim, Yongin-si (KR)

(73) Assignee: Samsung SDI Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/725,247

(22) Filed: Mar. 19, 2007

(65) Prior Publication Data

US 2007/0216306 A1 Sep. 20, 2007

(30) Foreign Application Priority Data

Mar. 20, 2006 (KR) ............. 10-2006-0025243

(51) Int. Cl.
*H01J 17/49* (2006.01)
(52) U.S. Cl. ..................... 313/582; 445/24
(58) Field of Classification Search .......... 313/582–587
See application file for complete search history.

(56) References Cited

U.S. PATENT DOCUMENTS

| | | | | |
|---|---|---|---|---|
| 4,494,038 A | * | 1/1985 | Wedding et al. | 313/587 |
| 5,776,540 A | * | 7/1998 | Chadha et al. | 427/126.3 |
| 6,778,240 B2 | * | 8/2004 | Nakamura et al. | 349/112 |
| 6,805,601 B2 | * | 10/2004 | Aoki et al. | 445/24 |
| 7,190,525 B2 | * | 3/2007 | Ito et al. | 359/599 |
| 7,224,123 B2 | * | 5/2007 | Lee | 313/586 |
| 7,253,559 B2 | * | 8/2007 | Chang | 313/586 |
| 2003/0102803 A1 | | 6/2003 | Chang | |
| 2003/0155863 A1 | * | 8/2003 | Lee | 313/587 |
| 2004/0150341 A1 | * | 8/2004 | Lee | 313/582 |
| 2006/0068209 A1 | * | 3/2006 | Hirose et al. | 428/426 |
| 2006/0119249 A1 | * | 6/2006 | Miyata et al. | 313/495 |
| 2006/0238124 A1 | * | 10/2006 | Yoo | 313/584 |

FOREIGN PATENT DOCUMENTS

CN 1522978 A1 8/2004

(Continued)

OTHER PUBLICATIONS

EP Search Report regarding EP Application No. 07104470.5—2208 dated Jun. 26, 2007.

(Continued)

*Primary Examiner*—Peter J Macchiarolo
*Assistant Examiner*—Donald L Raleigh
(74) *Attorney, Agent, or Firm*—Knobbe Martens Olsen & Bear LLP

(57) ABSTRACT

The plasma display panel (PDP) includes a front substrate and a second dielectric layer. At least one of the front substrate and the second dielectric layer is formed of a glass material. The glass material includes a transition metal oxide and a rare earth metal oxide. The transition metal oxide is at least one of oxides of cobalt (Co), nickel (Ni), selenium (Se), iron (Fe), manganese (Mn), chromium (Cr), vanadium (V) and scandium (Sc). The rare earth metal oxide is at least one of oxides of praseodymium (Pr), neodymium (Nd), samarium (Sm), dysprosium (Dy) and holmium (Ho).

17 Claims, 2 Drawing Sheets

FOREIGN PATENT DOCUMENTS

| | | | |
|---|---|---|---|
| EP | 1672667 | A | 6/2006 |
| FR | 2 876 094 | A1 | 10/2004 |
| JP | 11001342 | A * | 1/1999 |
| JP | H11-001342 | A | 1/1999 |
| JP | H11-349346 | A | 12/1999 |
| JP | 2001-139342 | A | 5/2001 |
| JP | 2005-344021 | A | 12/2005 |
| KR | 10-1999-0073478 | A | 10/1999 |
| KR | 10-2005-0079005 | A | 8/2005 |
| KR | 10-2006-0085539 | A | 7/2006 |

OTHER PUBLICATIONS

Byung-Hae Jung, et al., Thermal, Dielectric, and Optical Properties of Neodymium Borosilicate Glasses For Thick Films, Journal of the American Ceramic Society, 2003, vol. 86, No. 7, pp. 1202-1204.

Office Action issued by the Chinese Patent Office on Jun. 26, 2009 in 12 pgs.

* cited by examiner

L* : light / dark    $L^* = 116(Y/Y_n)^{1/3} - 16$ a* : red(+) / green(−)    $a^* = 500[(X/X_n)^{1/3} - (Y/Y_n)^{1/3}]$ b* : yellow(+) / blue(−)    $b^* = 200[(Y/Y_n)^{1/3} - (Z/Z_n)^{1/3}]$

PLASMA DISPLAY PANEL

CROSS-REFERENCE TO RELATED APPLICATION

This application claims priority to and the benefit of Korean Patent Application No. 10-2006-0025243 filed Mar. 20, 2006 in the Korean Intellectual Property Office, the entire contents of which are incorporated herein by reference.

BACKGROUND

1. Field

The present invention relates to a display device, and more particularly, to plasma display panel (PDP) device.

2. Discussion of the Related Technology

Recently, researchers have been making diverse attempts to improve the image quality of a plasma display panel (PDP) and enhance color purity and contrast. These attempts have proceeded in a direction such that the material or structure of a PDP is modified. To be specific, the bright room contrast ratio may be able to be improved to an extent by changing the composition of the materials that constitute a PDP, such as substrates, dielectric substances, barrier ribs, and phosphors, or by adding a new element thereto. However, the improvement may cause another problem.

Japanese Patent laid-open No. Hei 11-1342 discloses a PDP using a glass substrate that includes a minute amount of nickel oxide and cobalt oxide in addition to the composition of the glass substrate as a front substrate. The glass substrate brings about an effect of increased contrast of the PDP, as the nickel oxide and cobalt oxide absorb external light and decrease the transmittance of visible light. However, since the coloring by the nickel ocide and cobalt oxide may decrease transmittance of light over the entire wavelength zone of the visible light and absorb light emitted from the phosphor as well, the brightness of the image may decrease.

Meanwhile, a discharge gas is injected to the inside of the panel of the PDP. The discharge gas is a mixed gas of xenon (Xe) and neon (Ne). Neon gas generates orange visible light at a wavelength of around 585 nm. Since the red, green, and blue colors generated from red, green, and blue phosphors in the PDP may include the orange color, there is a problem in that colors are not accurately represented due to the orange color. Korean Patent Publication No. 1999-0073478 discloses a technology wherein the color purity and contrast are improved by adding a minute amount of rare earth metal oxides, i.e., neodymium oxide ($Nd_2O_3$) and praseodymium oxide ($Pr_2O_3$) to a dielectric layer to thereby block the orange light emitted from the neon discharge gas.

The discussion in this section is to provide general background information, and does not constitute an admission of prior art.

SUMMARY

One aspect of the invention provides a plasma display panel (PDP) comprising a front substrate; a rear substrate opposing the front substrate; a plurality of address electrodes disposed between the front substrate and the rear substrate; a first dielectric layer disposed between the front substrate and the rear substrate, wherein the plurality of address electrodes are buried between the first dielectric layer and the rear substrate; a plurality of barrier ribs disposed between the first dielectric layer and the front substrate to define discharge spaces; a phosphor layer disposed in at least part of the discharge spaces; a plurality of display electrodes disposed between the front substrate and the first dielectric layer; a second dielectric layer disposed between the front substrate and the rear substrate, wherein the plurality of display electrodes are buried between the second dielectric layer and the front substrate; and a protective layer disposed between the second dielectric layer and the rear substrate, wherein at least one of the front substrate and the second dielectric layer includes at least one transition metal oxide selected from the group consisting of oxides of cobalt (Co), nickel (Ni), selenium (Se), iron (Fe), manganese (Mn), chromium (Cr), vanadium (V), and scandium (Sc), and wherein the at least one of the front substrate and the second dielectric layer, which includes the at least one transition metal oxide, further includes at least one rare earth metal oxide selected from the group consisting of oxides of praseodymium (Pr), neodymium (Nd), samarium (Sm), dysprosium (Dy), and holmium (Ho).

In the foregoing plasma display panel, the at least one of the front substrate and the second dielectric layer may include a glass material. The glass material may have $26<L^*<36$, and $b^*<-3.5$ or $1<b^*$ under the CIE $L^*a^*b^*$ convention. The at least one transition metal oxide and the at least one rare earth metal oxide may be substantially uniformly dispersed in the front substrate. The glass material may include one selected from the group consisting of soda lime glass, neutral borosilicate glass, and non-alkali glass. The glass material may include the at least one transition metal oxide from about 0.01 to about 2 wt % with respect to the total weight of the glass material. The glass material may include the at least one transition metal oxide prepared by adding at least one selected from the group consisting of oxides, chlorides, nitrides, and sulfides of cobalt (Co), nickel (Ni), selenium (Se), iron (Fe), manganese (Mn), chromium (Cr), vanadium (V) and scandium (Sc) to a glass material without the transition metal oxide. The glass material may include the at least one rare earth metal oxide from about 0.01 to about 4 wt % with respect to the total weight of the glass material. The glass material may include the at least one rare earth metal oxide is prepared by adding at least one selected from the group consisting of oxides, chlorides, nitrides, and sulfides of praseodymium (Pr), neodymium (Nd), samarium (Sm), dysprosium (Dy) and holmium (Ho) to a glass material without the rare earth metal oxide. The weight ratio of the at least one transition metal oxide to the at least one rare earth metal oxide may be from about 0.5 to about 2.

Another aspect of the invention provides a display device comprising: a front substrate comprising a display surface to display an image thereon; a rear substrate opposing the front substrate; a plurality of discharge cells interposed between the front substrate and the rear substrate; a plurality of discharge electrodes interposed between the front substrate and the plurality of discharge cells, and a dielectric layer interposed between the front substrate and the plurality of discharge cells, wherein a plurality of discharge electrodes are buried between the front substrate and the dielectric layer, wherein at least a portion of the front substrate includes at least one rare earth metal oxide selected from the group consisting of oxides of praseodymium (Pr), neodymium (Nd), samarium (Sm), dysprosium (Dy), and holmium (Ho).

In the foregoing device, the portion of the front substrate may further include at least one transition metal oxide selected from the group consisting of oxides of cobalt (Co), nickel (Ni), selenium (Se), iron (Fe), manganese (Mn), chromium (Cr), vanadium (V), and scandium (Sc). At least a portion of the dielectric layer may include at least one transition metal oxide selected from the group consisting of oxides of cobalt (Co), nickel (Ni), selenium (Se), iron (Fe), manganese (Mn), chromium (Cr), vanadium (V), and scandium (Sc). The portion of the dielectric layer may further include at least one rare earth metal oxide selected from the group consisting of oxides of praseodymium (Pr), neodymium (Nd), samarium (Sm), dysprosium (Dy), and holmium (Ho). The front substrate may be configured to absorb a substantial amount of visible light with a wavelength about 550 nm to about 600 nm. The front substrate has the value of L* about 26 to about 36. The front substrate may have the value of b* smaller than about −3.5 or greater than about 1 under the CIE L*a*b* convention.

One embodiment of the present invention provides a plasma display panel (PDP) that can improve a bright room contrast ratio by reducing external light reflection brightness without affecting the electrical and optical characteristics of the PDP, and improve color purity by blocking neon light emission. According to one embodiment of the present invention, a PDP that includes a transition metal oxide and a rare earth metal oxide in either of a front substrate and a front dielectric layer that uses a glass material is provided.

The transition metal oxide includes at least one selected from the group consisting of oxides of cobalt (Co), nickel (Ni), selenium (Se), iron (Fe), manganese (Mn), chromium (Cr), vanadium (V) and scandium (Sc), and the rare earth metal oxide includes at least one selected from the group consisting of oxides of praseodymium (Pr), neodymium (Nd), samarium (Sm), dysprosium (Dy) and holmium (Ho). The transition metal oxide and the rare earth metal oxide are included at a weight ratio of about 1:0.5 to about 1:2. With respect to the composition or material of a glass, the transition metal oxide is about 0.01 wt % to about 2 wt % and the rare earth metal oxide is 0.01 wt % to 4 wt %. The glass material used in at least one of a front substrate and a second dielectric layer has 26<L*<36, and b*<−3.5 or 1<b* under the CIE L*a*b*.

DETAILED DESCRIPTION OF EMBODIMENTS

Exemplary embodiments of the present invention will hereinafter be described in detail with reference to the accompanying drawings.

Figure 1:
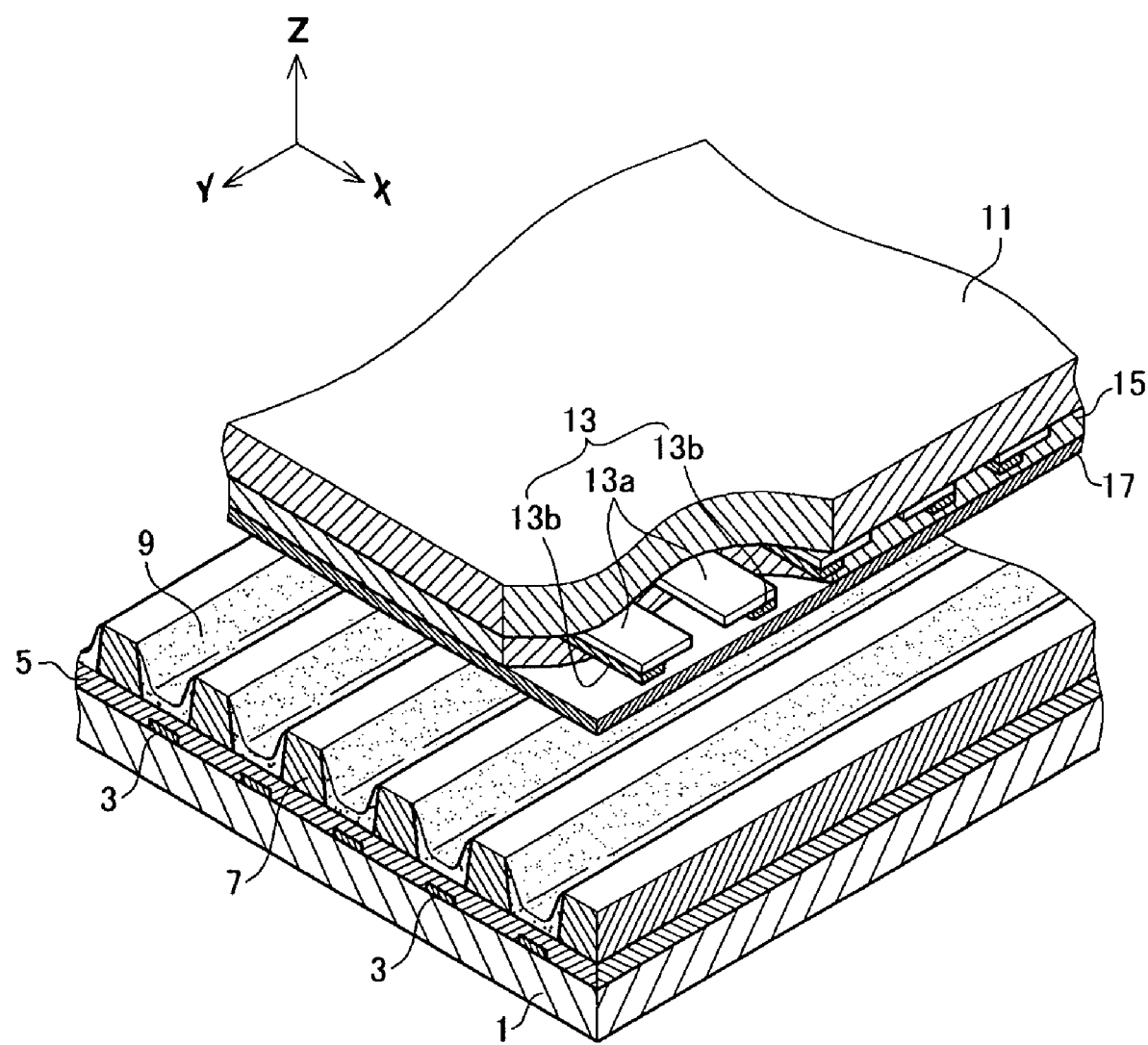
FIG. 1 is a partial exploded perspective view showing one embodiment of a plasma display panel (PDP) according to an embodiment of the present invention.

FIG. 1 is a partial perspective view showing a plasma display panel (PDP) in accordance with an embodiment of the present invention. However, the present invention is not limited to the structure shown in FIG. 1. Referring to the drawing, the PDP according to an embodiment of the present invention includes a rear substrate 1, a plurality of address electrodes 3 disposed in one direction (a Y direction in the drawing) on the rear substrate 1, and a first dielectric layer 5 disposed on the entire surface of the rear substrate I and covering the address electrodes 3. Barrier ribs 7 are formed on the dielectric layer 5, and red (R), green (G), and blue (B) phosphor layers 9 are disposed in discharge cells formed between the barrier ribs 7. A layer for lowering reflective brightness may be disposed on top of the barrier ribs 7.

Display electrodes 13, each including a pair of a transparent electrode 13a and a bus electrode 13b, are disposed in a direction crossing the address electrodes 3 (an X direction in the drawing) on the surface of a front substrate 11 facing the rear substrate 1. Also, a second dielectric layer 15 and a protection layer 17 are disposed on the entire surface of the front substrate 11 to cover the display electrodes 13. The discharge cells are formed at positions where the address electrodes 3 are crossed with the display electrodes 13.

With the above-described structure, the addressing discharge is performed by applying an address voltage (Va) to a space between the address electrodes 3 and any one display electrode 13. When a sustain voltage (Vs) is applied to the space between a pair of display electrodes 13, ultraviolet rays generated by the sustaining discharge excite a corresponding phosphor layer 9 to emit visible light through the front substrate 11.

As shown in the following Equation 1, the bright room contrast ratio of the PDP is related to the external light reflection brightness (Y) which indicates the extent of reflection of external light transmitted from the outside.

$$\text{The bright room contrast ratio (\%)} = ((L_{peak} + Y)/(L_{b.g} + Y)) \times 100 \quad (1)$$

where $L_{peak}$ denotes a peak brightness; $L_{b.g}$ denotes a background brightness; and Y denotes an external light brightness. To sum up, the smaller the external light reflection brightness is, the greater the bright room contrast ratio of the PDP. Thus, it is possible to prevent the screen of a PDP device from looking generally white.

In one embodiment, the front substrate 11 and the second dielectric layer 15 of the PDP device having the above-described structure are formed of a transparent glass material, and at least one of the front substrate 11 and the second dielectric layer 15 includes a transition metal oxide and a rare earth metal oxide. The transition metal oxide increases the bright room contrast ratio, and the transition metal oxide includes at least one oxide selected from the group consisting oxides of cobalt (Co), nickel (Ni), selenium (Se), iron (Fe), manganese (Mn), chromium (Cr), vanadium (V), scandium (Sc). The transition metal or element oxide exists in the front substrate 11 and/or the second dielectric layer 15 formed over the front substrate 11. The color of the glass substrate may be different according to the kind of the transition metal oxide. For example, when cobalt oxide or nickel oxide is added, the glass substrate is colored gray. In an embodiment, the front substrate is formed of a glass material and the transition metal oxide from about 0.01 to about 2 wt % of the total weight of the glass material is included. In certain embodiments, the transition metal oxide in an amount of about 0.01, 0.05, 0.1, 0.2, 0.3, 0.5, 1, 1.5 or 2 wt % of the total weight of the glass material is included in the glass material. In some embodiments, the transition metal oxide in an amount within a range defined two of the foregoing amounts is included in the glass material.

Meanwhile, neon gas which is the discharge gas injected into discharge cells generates an orange visible light at a wavelength around 550 to 600 nm, and the orange light may deteriorate the color purity and contrast of the PDP. The present embodiment blocks the orange visible light by adding the rare earth metal oxide to the glass substrate. The rare earth metal oxide includes at least one oxide selected from the group consisting of oxides of praseodymium (Pr), neodymium (Nd), samarium (Sm), dysprosium (Dy) and holmium (Ho). The rare earth metal oxide has a selective transmission and absorption property. That is, it absorbs light of a predetermined wavelength while it transmits the red, green, and blue visible light emitted in the phosphor layer. For example, the rare earth metal oxide absorbs the orange light selectively. In one embodiment, the front substrate is formed of a glass material and the rare earth metal oxide in an amount from about 0.01 wt % to about 4 wt % of total weight of the glass material is included in the glass material. In certain embodiments, the rare earth metal oxide in an amount of about 0.01, 0.03, 0.05, 0.1, 0.2, 0.3, 0.5, 1, 1.5, 2, 3 or 4 wt % of the total weight of the glass material is included in the glass material. In some embodiments, the rare earth metal oxide in an amount within a range defined two of the foregoing amounts is included in the glass material.

When the transition metal oxide and the rare earth metal oxide are used simultaneously, which is suggested in the discussed embodiment, it is possible to prevent the physical or optical characteristics of the PDP from deteriorating and to improve the bright room contrast ratio and color purity, when comparing to a case where only one of the transition metal oxide and the rare earth metal oxide is used.

In one embodiment, the front substrate and the dielectric layer of the front substrate in the PDP are formed of a glass material which include the transition metal oxide and the rare earth metal oxide. Non-limiting examples of the glass material generally used in a substrate for a display are soda lime glass, neutral borosilicate glass, and non-alkali glass.

Although the composition of the glass material is not limited to one introduced in the present embodiment, the glass material includes ZnO in an amount of about 20 to about 70 wt %; BaO in an amount from about 10 to about 50 wt %; $B_2O_3$ in an amount from about 10 to about 40 wt %; $P_2O_5$ in an amount from 0 to about 20 wt %; $SiO_2$ in an amount from about 0 to about 20 wt %; $Bi_2O_3$ in an amount from 0 to about 20 wt %; $V_2O_5$ in an amount from 0 to about 30 wt %; at least one oxide selected from the group consisting of $Na_2O$, $Li_2O$ and $K_2O$ in an amount from 0 to about 10 wt %, CaO in an amount from 0 to about 10 wt %, MgO in an amount from 0 to about 10 wt %, SrO in an amount from 0 to about 30 wt %, $MoO_3$ in an amount from 0 to about 20 wt %; $Al_2O_3$ in an amount from 0 to about 10 wt %; at least one oxide selected from the group consisting of $Sb_2O_3$, CuO, $Cr_2O_3$, $As_2O_3$, CoO and NiO in an amount from 0 to about 10 wt %; and $TiO_2$ in an amount from 0 to 10 wt % of the total weight of the glass material.

Figure 2:
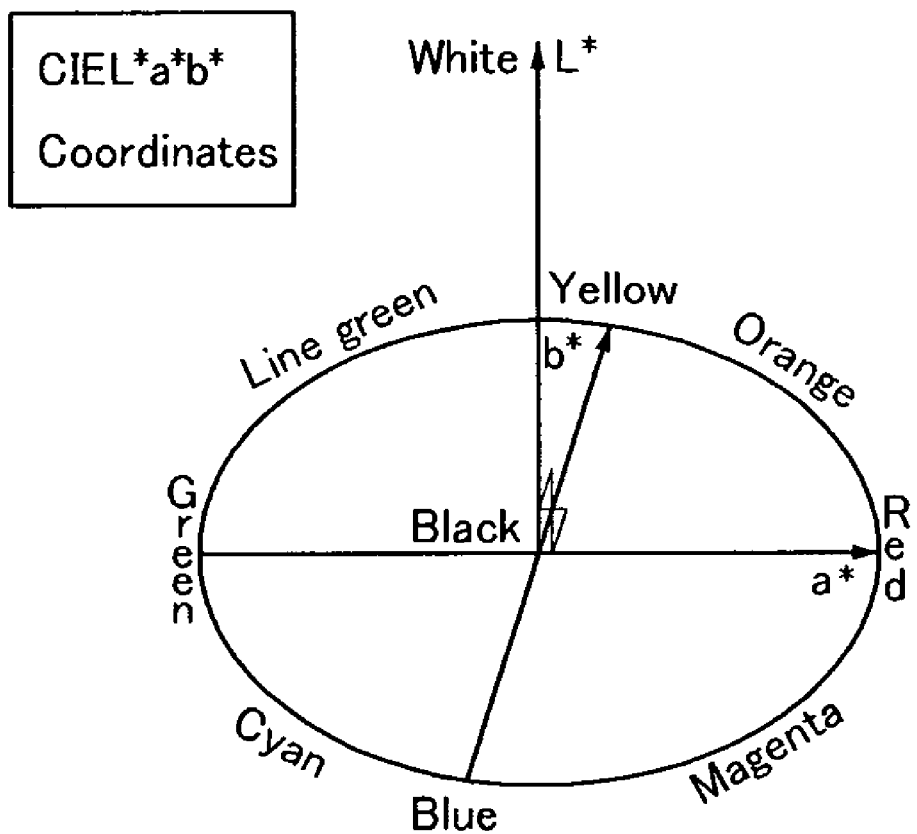
FIG. 2 is a view showing CIE L*a*b* color coordinates in a color coordinate system.

FIG. 2 is a view showing CIE L*a*b* color coordinates in a color coordinate system under the CIE L*a*b* convention. The CIE L*a*b* color coordinates represent quantified values of colors developed by the CIE (Commission Internationale de l'Eclairage, or the International Commission on Illumination). Referring to FIG. 2, the CIE LAB (L*a*b*) is a space of which the vertical axis is L* denoting a chrominance and the horizontal plane is formed of a* and b*. Herein, as the a* value becomes large in a positive direction, the color grows more reddish. As it becomes large in a negative direction, the color grows more greenish. Also, as the b* value becomes large in a positive direction, the color grows more yellowish, and as it becomes large in a negative direction, the color grows more bluish. The color at the center is achromatic.

The glass material used in at least one of a front substrate 11 and a second dielectric layer 15 has about 26<L*<about 36 and b*<about −3.5 or about 1<b* under the CIE L*a*b*. Such a glass material having optimal brightness and chromaticity is used in the front substrate 11 and the second dielectric layer 15. The L* value is linearly proportional to the transmittance of the front substrate 11 or the second dielectric layer 15. The glass composition for a front substrate and a second dielectric layer includes a transition metal oxide and a rare earth metal oxide in order to satisfy the CIE L*a*b* value condition.

The glass substrate of the present embodiment including the transition metal oxide and the rare earth metal oxide is produced by a) adding a transition metal compound and a rare earth metal compound to the metal oxide powder composing the glass substrate and mixing them; b) fusing the mixed material; and c) quenching and molding the fused material. The transition metal compound of the step a) is a compound material that can form a transition metal oxide. In one embodiment, the transition metal compound is a mixture of at least one of oxides, chlorides, nitrides and sulfides of the transition metals. The rare earth metal compound is a mixture of materials that can form rare earth metal oxides. In one embodiment, the rare earth metal compound is a mixture of at least one of chlorides, nitrides, and sulfides of the rare earth metals.

The fusion in the step b) is performed at a temperature ranging from about 1000 to about 1500° C. for about 10 minutes to about an hour to uniformly mix the components. When the fusion is carried out under the above-described conditions, desirable physical characteristics can be acquired. The quenching in the step c) may be carried out in a dry or wet procedure. In the wet quenching, water may be used, and after quenching, the fused material is molded by way of a method such as slot down drawing, overflow down drawing, floating and roll-out, and cut out, to thereby completing the fabrication of the glass substrate.

As described above, the present embodiment has the effects obtained from the simultaneous use of the transition metal oxide and the rare earth metal oxide. Moreover, they can increase transmittance without using a filtering layer for neon and offsetting the optical quality and electric shielding effects acquired from the oxides. As a result, the bright room contrast ratio and color purity of the PDP are improved.

The following examples illustrate the present invention in detail. However, it is understood that the present invention is not limited by these examples.

EXAMPLES

Example 1-2 and Comparative Example 1

Metal oxides of the composition shown in the following Table 1 were prepared in a polyethylene container with zirconia balls and ethanol was inputted thereto. Ball; milling was performed for 20 hours to uniformly mix the metal oxide. In Comparative Example1, PD-200 from the AGC company which is most widely used as a front substrate was used.

The powder mixture was put into a platinum crucible, fused at 1250° C. for two hours, dry-quenched, roughly pulverize with a disk mill, and then finely pulverized with a dry pulverizer. The dried mixture was crushed, inputted into a tin chamber, and molded in the form of a plate to complete the fabrication of a glass substrate for a PDP.

TABLE 1

| | Composition | Example 1 | Example 2 |
|---|---|---|---|
| Mother-glass composition (wt %) | Silica ($SiO_2$) | 57.3 | 57.0 |
| | sodium oxide ($Na_2O$) | 10.4 | 10.4 |
| | boric acid ($H_3BO_3$) ($B_2O_3$) | 0.2 | 0.2 |
| | Alumina ($Al_2O_3$) | 7.1 | 7.1 |
| | Magnesium oxide (MgO) | 10.0 | 10.0 |
| | calcium carbonate ($CaCO_3$) | 11.6 | 11.6 |
| | zinc oxide ($ZrO_2$) | 3.1 | 3.1 |
| Transition metal oxide (wt %) | Cobalt oxide (CoO) | 0.1 | 0.2 |
| | Nickel oxide (NiO) | 0.1 | 0.2 |
| Rare earth metal oxide (wt %) | Praseodymium oxide ($Pr_2O_3$) | 0.05 | 0.1 |
| | Neodymium oxide ($Nd_2O_3$) | 0.05 | 0.1 |

Optical transmittance of the glass substrates prepared according to Examples 1 and 2 and Comparative Example 1 was measured with a spectrophotometer by using light with a wavelength of 550 nm. Also, external light reflection brightness was measured and bright room contrast ratio was calculated based on the Equation 1. The results are presented in the following Table 2.

TABLE 2

|  | Example 1 | Example 2 | Comparative Example 1 |
|---|---|---|---|
| Color | Yellowish Gray | Bluish gray | Transparent |
| Transmittance | 69.62 | 70 | 90 |
| External light reflective brightness (cd/m$^2$) | 7.60 | 7.67 | 12.39 |
| Bright room contrast ratio | 87.9:1 | 87.1:1 | 70:1 |
| L* | 31 | 35 | 38 |
| b* | 1.06 | −3.98 | −2.54 |

According to Table 2, the glass substrate of Comparative Example 1, which is generally used as a front glass substrate, had transmittance of about 90%, which is close to transparent, and an external light reflection brightness of 12.39 cd/m$^2$.

On the other hand, the glass substrate of Example I showed thin yellowish gray, and the glass substrate of Example 2 showed bluish gray. The L* value and b* value of the substrate according to Example 1 were respectively 31 and 1.06, and the L* value and b* value of the substrate according to Example 2 were respectively 35 and −3.98. Particularly, the transmittance of the glass substrate prepared according to Example 1 was 69.62%, which was 22.6% lower than that of the glass substrate prepared according to Comparative Example 1, and its external light reflection brightness was reduced by 38.6%, when compared to those of the glass substrate of Comparative Example 1. The glass substrate of Example 2 also had transmittance reduced by 22.2% and external light reflection brightness reduced by 38.1%, when compared to those of Comparative Example 1.

Generally, the transmittance and the external light reflection brightness are reduced in proportion. However, in the substrate of the present embodiment, the external light reflection brightness was reduced more than the transmittance, which dominates the brightness. This brought about an effect that the bright room contrast ratio was improved based on Equation 1.

Example 3:

Preparation of a PDP Device

A PDP device was prepared by using the glass substrate prepared according to Example 1 as a front substrate. ITO was deposited on the glass substrate to thereby form an ITO transparent electrode. Then, a bus electrode, a sustain electrode, a dielectric layer, and a protective layer were formed on top of the ITO transparent electrode to thereby form a front substrate, and a rear electrode composed of an address electrode, a dielectric layer, barrier ribs, and a phosphor layer was prepared. A PDP was prepared by assembling the front and rear substrates, sealing them together, exhausting, injecting a discharge gas, and aging. Meanwhile, a PDP device is fabricated by setting up a front filter with an electron shield layer formed on a transparent substrate in a front cabinet, and setting up the PDP and chassis base between the front cabinet and a back cover. As described above, of the present embodiment realizes a high-quality image by adding a transition a rare earth metal oxide to a front substrate formed of a glass material, and right room contrast ratio and color purity. While embodiments of this invention has been described, it is to be the invention is not limited to the disclosed embodiments, but, on the ended to cover various modifications and equivalent arrangements included and scope of the appended claims.

What is claimed is:

1. A plasma display panel (PDP) comprising:
    a first substrate on a front side of the PDP;
    a second substrate on a rear side opposing the first substrate;
    a plurality of address electrodes disposed between the first substrate and the second substrate;
    a first dielectric layer disposed between the first substrate and the second substrate, wherein the plurality of address electrodes are buried between the first dielectric layer and the second substrate;
    a plurality of barrier ribs disposed between the first dielectric layer and the first substrate to define discharge spaces;
    a phosphor layer disposed in at least part of the discharge spaces;
    a plurality of display electrodes disposed between the first substrate and the first dielectric layer;
    a second dielectric layer disposed between the first substrate and the second substrate, wherein the plurality of display electrodes are buried between the second dielectric layer and the first substrate; and
    a protective layer disposed between the second dielectric layer and the second substrate,
    wherein the first substrate comprises at least one transition metal oxide selected from the group consisting of oxides of cobalt (Co), nickel (Ni), iron (Fe), manganese (Mn), chromium (Cr), and vanadium (V), and further comprises at least one rare earth metal oxide selected from the group consisting of oxides of praseodymium (Pr), neodymium (Nd), samarium (Sm), dysprosium (Dy), and holmium (Ho), and wherein the weight ratio of the at least one transition metal oxide to the at least one rare earth metal oxide being from about 0.5 to about 2.

2. The plasma display panel of claim 1, wherein the first substrate comprises a glass material.

3. The plasma display panel of claim 2 wherein the glass material has 26<L*<36, and b*<−3.5 or 1<b* under the CIE L*a*b* convention.

4. The plasma display panel of claim 2, wherein the at least one transition metal oxide and the at least one rare earth metal oxide are substantially uniformly dispersed in the first substrate.

5. The plasma display panel of claim 2, wherein the glass material comprises one selected from the group consisting of soda lime glass, neutral borosilicate glass, and non-alkali glass.

6. The plasma display panel of claim 2, wherein the glass material comprises the at least one transition metal oxide from about 0.01 to about 2 wt% with respect to the total weight of the glass material.

7. The plasma display panel of claim 2, wherein the glass material comprises the at least one transition metal oxide prepared by adding at least one selected from the group consisting of oxides, chlorides, nitrides, and sulfides of cobalt (Co), nickel (Ni), iron (Fe), manganese (Mn), chromium (Cr), and vanadium (V) to a glass material without the transition metal oxide.

8. The plasma display panel of claim 2, wherein the glass material comprises the at least one rare earth metal oxide from about 0.01 to about 4 wt % with respect to the total weight of the glass material.

9. The plasma display panel of claim 2, wherein the glass material comprises the at least one rare earth metal oxide is prepared by adding at least one selected from the group consisting of oxides, chlorides, nitrides, and sulfides of praseodymium (Pr), neodymium (Nd), samarium (Sm), dysprosium (Dy) and holmium (Ho) to a glass material without the rare earth metal oxide.

10. A display device comprising:
a first substrate on a front side of the display device comprising a display surface to display an image thereon;
a second substrate on a rear side opposing the first substrate;
a plurality of discharge cells interposed between the first substrate and the second substrate;
a plurality of discharge electrodes interposed between the first substrate and the plurality of discharge cells, and
a dielectric layer interposed between the first substrate and the plurality of discharge cells, wherein the plurality of discharge electrodes are buried between the first substrate and the dielectric layer,
wherein at least a portion of the first substrate comprises at least one rare earth metal oxide selected from the group consisting of oxides of praseodymium (Pr), neodymium (Nd), samarium (Sm), dysprosium (Dy), and holmium (Ho), and further comprises at least one transition metal oxide selected from the group consisting of oxides of cobalt (Co), nickel (Ni), iron (Fe), manganese (Mn), chromium (Cr) and vanadium (V), the weight ratio of the at least one transition metal oxide to the at least one rare earth metal oxide being from about 0.5 to about 2.

11. The device of claim 10, wherein at least a portion of the dielectric layer comprises at least one transition metal oxide selected from the group consisting of oxides of cobalt (Co), nickel (Ni), iron (Fe), manganese (Mn), chromium (Cr), vanadium (V), and scandium (Sc).

12. The device of claim 11, wherein the portion of the dielectric layer further comprises at least one rare earth metal oxide selected from the group consisting of oxides of praseodymium (Pr), neodymium (Nd), samarium (Sm), dysprosium (Dy), and holmium (Ho).

13. The device of claim 10, wherein the first substrate is configured to absorb a substantial amount of visible light with a wavelength about 550 nm to about 600 nm.

14. The device of claim 10, wherein the first substrate has the value of $L^*$ about 26 to about 36.

15. The device of claim 10, wherein the first substrate has the value of $b^*$ smaller than about $-3.5$ or greater than about 1 under the CIE $L^*a^*b^*$ convention.

16. The plasma display panel of claim 1, wherein the second dielectric layer comprises at least one transition metal oxide and at least one rare earth metal oxide.

17. The plasma display panel of claim 1, wherein no additional filtering layer configured to block orange light emitted from neon gas is present in said plasma display panel.

* * * * *